T. A. JEBB.
Duplex Railroad Tickets.

No. 137,208.  Patented March 25, 1873.

| No. of Ticket | Date | | | No. of Book | Amt. Paid | | No. of Book | Amt. Paid | | No. of Ticket | Date | | |
|---|---|---|---|---|---|---|---|---|---|---|---|---|---|
| 24 | | | | 635 | | | 635 | | | 24 | | | |
| | Jan. | 17 | 1 | | $0.05 | $0.05 | | $0.05 | $0.05 | | 1 | 17 | Jan. |
| | | 18 | 2 | | 0.10 | 0.10 | | 0.10 | 0.10 | | 2 | 18 | |
| | Mar. | 19 | 3 | | 0.15 | 0.15 | | 0.15 | 0.15 | | 3 | 19 | Mar. |
| | Apr. | 20 | 4 | | 0.20 | 0.20 | | 0.20 | 0.20 | | 4 | 20 | Apr. |
| | | 21 | 5 | | 0.25 | 0.25 | | 0.25 | 0.25 | | 5 | 21 | |
| | May | 22 | 6 | | 0.50 | 0.50 | | 0.50 | 0.50 | | 6 | 22 | May |
| | June | 23 | 7 | | 0.75 | 0.75 | | 0.75 | 0.75 | | 7 | 23 | June |
| | July | 24 | 8 | | 1.00 | 1.00 | | 1.00 | 1.00 | | 8 | 24 | July |
| | | 25 | 9 | | 1.25 | 1.25 | | 1.25 | 1.25 | | 9 | 25 | |
| | Aug. | 26 | 10 | | 1.50 | 1.50 | | 1.50 | 1.50 | | 10 | 26 | Aug. |
| | Sept. | 27 | 11 | | 1.75 | 1.75 | | 1.75 | 1.75 | | 11 | 27 | Sept. |
| | | 28 | 12 | | 2.00 | 2.00 | | 2.00 | 2.00 | | 12 | 28 | |
| | Oct. | 29 | 13 | | 2.50 | 2.50 | | 2.50 | 2.50 | | 13 | 29 | Oct. |
| | Nov. | 30 | 14 | | 3.00 | 3.00 | | 3.00 | 3.00 | | 14 | 30 | Nov. |
| | | 31 | 15 | | 4.00 | 4.00 | | 4.00 | 4.00 | | 15 | 31 | |
| | Dec. | | 16 | | 5.00 | 5.00 | | 5.00 | 5.00 | | 16 | | Dec. |
| | | | | | 6.00 | 6.00 | | 6.00 | 6.00 | | | | |
| | | | | | 7.00 | 7.00 | | 7.00 | 7.00 | | | | |
| | | | | | 8.00 | 8.00 | | 8.00 | 8.00 | | | | |
| | | | | | 9.00 | 9.00 | | 9.00 | 9.00 | | | | |
| | | | | | 10.00 | 10.00 | | 10.00 | 10.00 | | | | |

NEW YORK & HARLEM RAIL ROAD.

This half of the N.Y. Excess Baggage Ticket is of NO VALUE except to the Baggage Master who has issued duplicate half, and him only when the half is at the office of the Company, according to instructions.

NEW YORK & HARLEM
EXCESS BAGGAGE TICKET.
No. of Book 635    No. of Ticket 24.

Edward Wilhelm
John J. Bonner
} Witnesses.

Thos. A. Jebb, Inventor
by Jay Hyatt
Atty.

AM. PHOTO-LITHOGRAPHIC CO. N.Y. (OSBORNE'S PROCESS.)

UNITED STATES PATENT OFFICE.

THOMAS A. JEBB, OF BUFFALO, NEW YORK.

IMPROVEMENT IN DUPLEX RAILROAD TICKETS.

Specification forming part of Letters Patent No. 137,208, dated March 25, 1873.

B.

*To all whom it may concern:*

Be it known that I, THOMAS A. JEBB, of the city of Buffalo, in the county of Erie and State of New York, have invented an Improved Duplex Railroad Ticket, of which the following is a specification:

My improvement relates to the means for collecting of passengers traveling on railroads or steamboats charges for the extra baggage they may have over that which they are entitled to carry free of charge.

Heretofore such charges on railroads have been usually collected by the baggage-master at the station where the passenger takes the cars, who gives the passenger a ticket or receipt on which is written in pencil the sum paid and the name of the station or destination to which the charges have been paid—the baggage being surrendered at the end of the route on presentation of this ticket and check, when the latter is employed. As these baggage-tickets sometimes extend over several roads, the number of stations (which freqently amount to upward of one hundred) are so great as to render it impracticable to print the list of stations on such tickets so as to enable the destination or terminal station to be indicated by punching, as is done with passenger-tickets. These baggage-tickets, when lifted or taken up at the place of destination, are returned by the road thus lifting them to the office of the road where the money was collected, and thus serve as the evidence on which the distribution of the money among the different roads over which the baggage passed is made. The facility with which the amounts on such tickets can be changed; the opportunity which this method of collection affords the baggage-master for peculation by marking on the ticket a less sum than was actually paid, or marking it indistinctly or ambiguously; and the plausible excuse for a mistake in the figure which this method permits the baggage-master to make, in case the passenger discovers the discrepancy in the sum paid and that marked on the ticket in time to have it corrected, have, in connection with other inconveniences and objections, rendered this method extremely unsatisfactory and inadequate to properly accomplish the required purpose.

The object of my improvement is to furnish means for supplying and remedying these defects. My invention consists of a duplex folded ticket, each member or half of which is provided with a corresponding and coincident series of amounts of money, the names of the months of the year, and the days of the month, arranged so that the punching of any amount, month, and figure on one half or member affects the other half simultaneously, and with reference to the same amount, month, or figure; and having also a blank space for the terminal station, while the initial station may be printed or written, as will be more fully set forth.

The accompanying drawing represents a face view of one of my tickets unfolded.

I prefer to print the tickets as shown, with stubs *a*, and bind a convenient number of them in book form, with the stub of each ticket containing the name of the road, (New York and Harlem on the drawing,) the words "excess-baggage ticket," and figures denoting the number of the ticket and the number of the book, while the duplicate parts of each ticket are both numbered the same as the stub to which they are attached. The number of the book (635) is on each ticket and stub, while the tickets are consecutively numbered in the order they are bound in the book, the ticket shown being numbered twenty-four or the twenty-fourth in the book. I also prefer to print duplicate columns of figures on each half of a ticket, the figures of one column being punched out, while the amount in the adjacent column opposite the perforation will clearly indicate the amount paid. For instance, in the drawing the sum $1.25 is punched from the first column of each half of the ticket, while the same sum untouched in the adjacent column indicates the sum paid. When there is no sum in the column equal to the money paid, two or more sums are punched, which together will make up the amount paid. To illustrate, the punching of the two sums, as $7.00 and $0.25, would indicate that $7.25 has been paid. The names and days of the month are printed, as shown, in the outer or free edges of each half of the ticket. B B represent the blank space on which the terminal stations are to be written. The passenger portion of the ticket in the drawing has also printed on its face the following: "Passengers paying for excess weight of baggage will receive this colored half of duplex baggage-ticket; Punch-marks must indicate the amount paid and date; Destination will be written in by baggage-master; Baggage will be surrendered on presentation of this ticket with check;" while the baggage-master's portion has the following: "This half of patent excess-baggage ticket is of no value except to the baggage-master who issued duplicate half, and who must return this half to the office of the company, according to instructions." This printed matter can, of course, be varied as required. I also prefer to color a portion of the ticket designed for the passenger, as represented by the section lines in the drawing, so as to enable it to be more readily distinguished. This last feature, however, I have fully described and claimed in a separate application.

In using my improved excess-baggage ticket, the baggage-master receives from the office of the company a book or package of tickets, with which he is charged. He is then required to punch the date and amount paid from the folded ticket, and then separate and give one part to the passenger as a receipt, which he surrenders on delivery of the baggage to the baggage-master at the destination station. The duplicates retained by the baggage-master and tickets not used are returned to the office and settlement made with him accordingly, as in the case of passenger-conductors using tickets of this same general class.

Some of the features and the advantages resulting from the use of this ticket are similar to those described in the Letters Patent heretofore granted to me for duplicate tickets and books of the same, for the use of railroad conductors. A single ticket can be used over any length of road containing any number of stations, while it prevents peculation and fraud, and the changing of the sum after it has been once indicated by a punch-hole, and insures the proper division of the money paid among the different roads.

It will be observed that the advantage of the blank space for writing the terminal station enables the use of books printed upon one form on any road, and irrespective of the number of stations on any given road. The initial station may or may not be printed when the books are prepared with reference to a designated road.

What I claim as my invention is—

A folded duplex ticket, each member or half of which is provided with a corresponding and coincident series of amounts, names of months, and figures representing the days of the month, and adapted to be punched, as described, and having also a blank space for the terminal station, the initial station being printed or written, as hereinbefore set forth.

T. A. JEBB.

Witnesses:
JNO. J. BONNER,
EDWARD WILHELM.